United States Patent [19]

Luzzi et al.

[11] Patent Number: 4,684,764
[45] Date of Patent: Aug. 4, 1987

[54] HIGH VOLTAGE CABLE SPLICE PROTECTOR

[75] Inventors: Glenn J. Luzzi, Mt. Bethel, Pa.; Andrew A. Kominiak, Flanders, N.J.

[73] Assignee: Amerace Corporation, Hackettstown, N.J.

[21] Appl. No.: 806,591

[22] Filed: Dec. 9, 1985

[51] Int. Cl.⁴ .......................................... H02G 15/115
[52] U.S. Cl. .......................................... 174/91; 174/93
[58] Field of Search ................. 174/91, 93; 339/90 R, 339/209

[56] References Cited

U.S. PATENT DOCUMENTS

| | | | |
|---|---|---|---|
| 2,978,533 | 4/1961 | Colbert | 174/93 |
| 3,274,330 | 9/1966 | Becker et al. | 174/94 R |
| 3,321,733 | 5/1967 | Thomas | 339/90 R |
| 3,395,382 | 7/1968 | Weagant | 174/91 |
| 3,447,986 | 6/1969 | Kasahara | 174/91 |
| 3,654,588 | 4/1972 | Ruth | 174/91 |
| 3,673,311 | 6/1972 | Misare | 174/73 R |
| 3,705,950 | 12/1972 | Jirka et al. | 174/93 X |
| 3,818,124 | 6/1974 | Jirka | 174/91 X |
| 3,824,331 | 7/1974 | Mixon, Jr. et al. | 174/84 R X |
| 4,520,229 | 5/1985 | Luzzi et al. | 174/73 R |

FOREIGN PATENT DOCUMENTS

| | | | |
|---|---|---|---|
| 472618 | 2/1929 | Fed. Rep. of Germany | 339/90 R |
| 3329904 | 3/1985 | Fed. Rep. of Germany | 174/91 |

*Primary Examiner*—Morris H. Nimmo
*Attorney, Agent, or Firm*—David Teschner

[57] ABSTRACT

A two piece, plastic, bayonet locking housing for assembly over a high voltage cable splice to protect the splice and exposed concentric neutral wires. End seals are provided at the cable entrances to the housing to prevent the entrance of dirt and moisture and take the form of closely conforming rubber tubes. The rolled tubes are mounted on the slotted cable entrance ends of the housings and held there by the hoop forces of the housing. Radial displacement of the housing ends reduces these hoop forces permitting the tubes to start to unroll and the tubes are fully extended over the housing ends and onto and over a portion of the cables.

4 Claims, 8 Drawing Figures

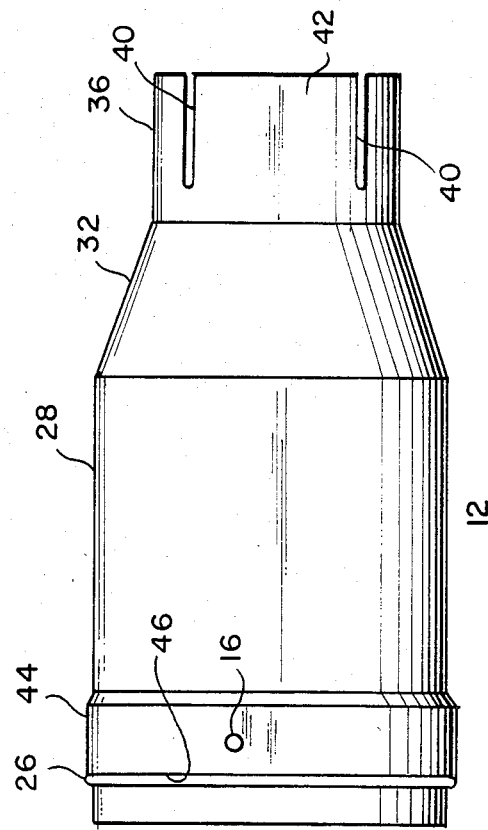
FIG. 1
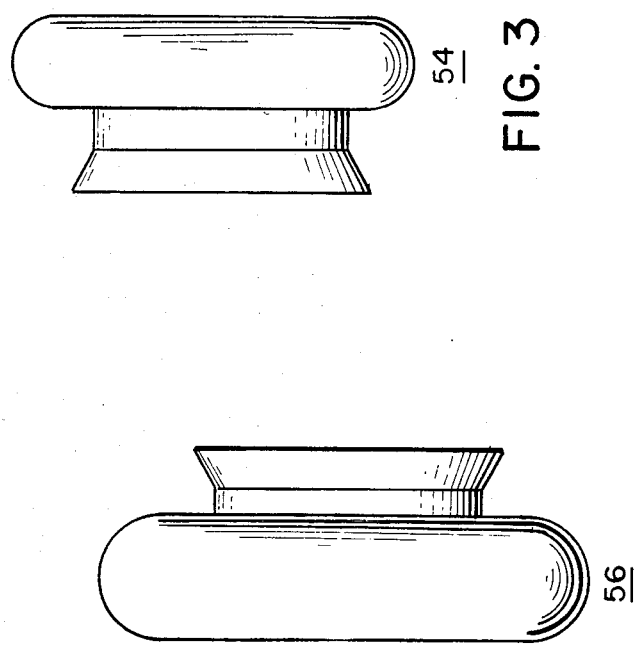
FIG. 3
FIG. 4
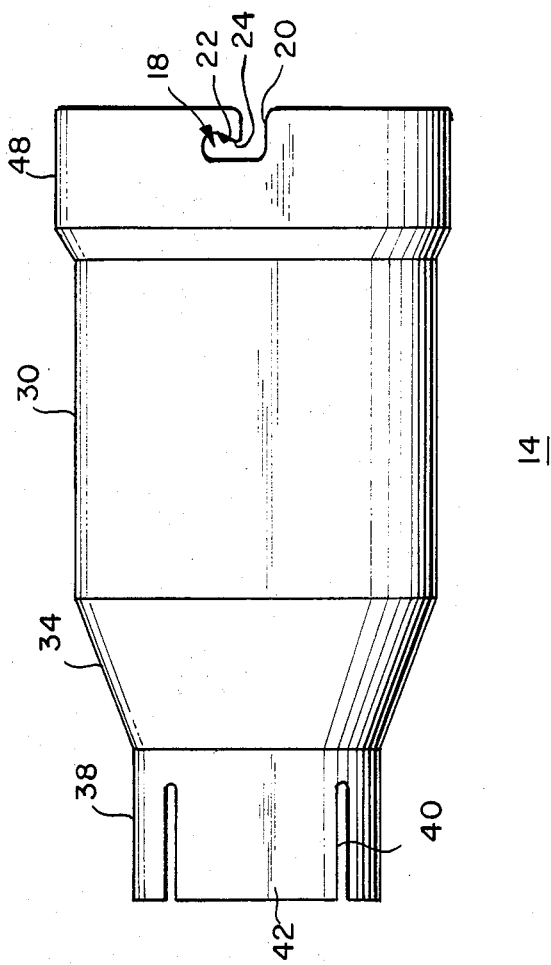
FIG. 2

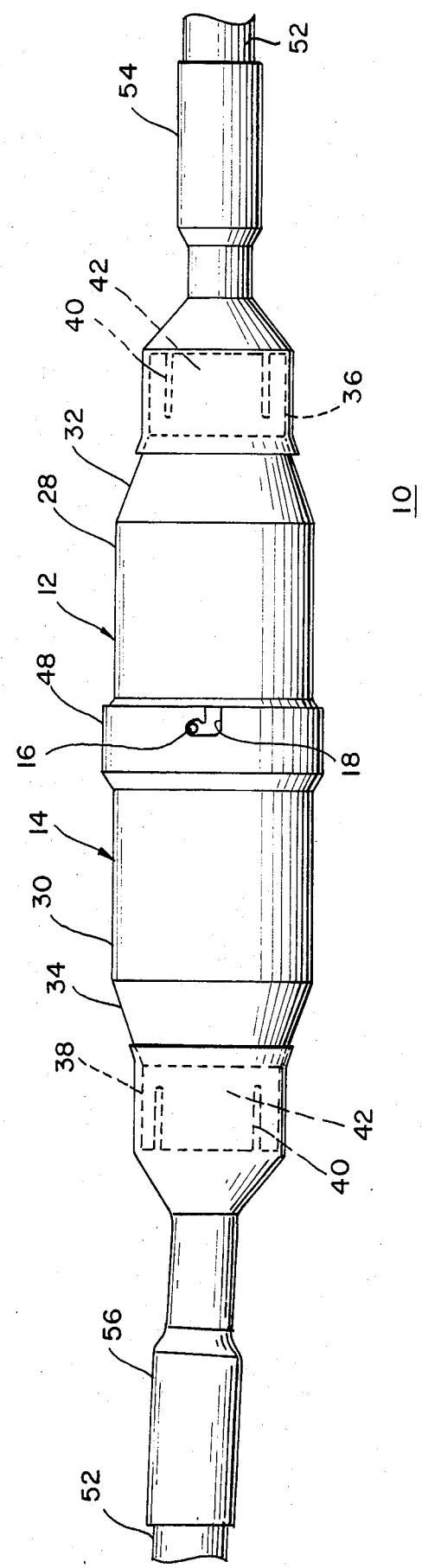

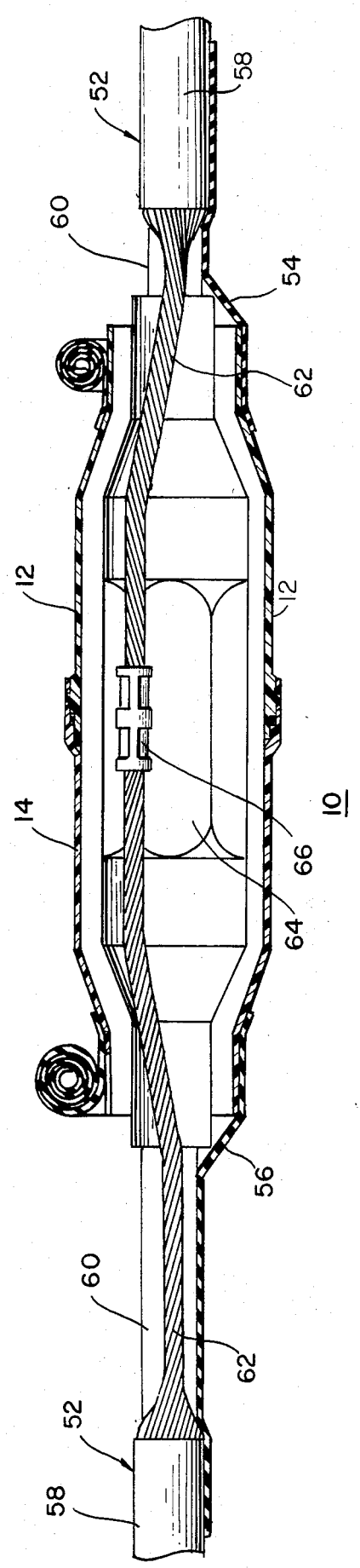
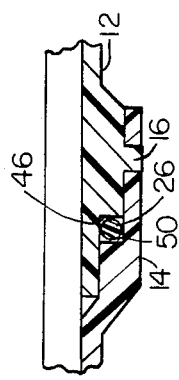
FIG. 6
FIG. 6a

HIGH VOLTAGE CABLE SPLICE PROTECTOR

BACKGROUND OF THE INVENTION

1. Field of the Invention

High voltage cable is provided with a shield conductor outside of the cable itself to provide a return circuit for load currents and also to maintain the outside surface of the cable at ground potential. This shield conductor often takes the form of a number of wire braids wrapped about the cable jacket and is termed a concentric neutral. This concentric neutral being outside of the normal cable jacket is not protected from the environment in which it is buried and is subject to the corrosive effects of water, acids, bases and other chemical substances now regularly found almost everywhere. The destruction of this concentric neutral removes the return path for the load currents and could cause increasing voltage potentials of the shield and could render any contact with the energized cable dangerous.

The industry has countered the injury to the concentric neutral by placing a jacket over the entire cable concentric neutral and all. High voltage cable being heavy and large in size can only be fabricated in relatively short lengths. These lengths must be spliced and the joints protected so that the cable is protected as well as the fittings.

The invention herein is directed to a housing which can be placed over a high voltage cable splice and sealed to prevent the entrance of environmental materials into the splice which could attack such splice and the associated cables.

2. Description of the Prior Art

U.S. Pat. No. 2,978,533 issued Dec. 26, 1957 shows a cable splice enclosure made of two rubber portions made to overlap and locked to one another by means of an external hose clamp. Likewise the end seals are accomplished by hose clamps giving a limited adjustment range. Exposed metallic hose clamps would have a short useful life buried in the ground and could provide electrical hazards.

U.S. Pat. No. 3,705,950 issued Dec. 12, 1972 makes use of a central container screw threaded at both ends. Two conical end portions, one for each end, are screwed onto the central container and have stepped ends to match various diameter cables. Closure is also achieved by means of external, metal hose clamps.

The cable connector box shown is U.S. Pat. No. 3,818,124 issued June 18, 1979 makes use of a central plastic cylinder with plastic end caps. The ends of the caps are stepped to accommodate different diameter cables. It is assumed that the resiliency of the end caps causes it to conform to the central cylinder diameter and the various cable diameters and give tight seals at the interfaces. Such an arrangement is limited in the number of steps which the end caps contain and require that the caps be forced along the cable during installation making their use more difficult.

U.S. Pat. No. 3,274,330 issued Sept. 20, 1966 uses a crimpable connector with a depressed central section upon which is placed an insulating sleeve rolled from both ends. Once the two cables are crimped, the sleeve is unrolled. This arrangement is only usable as a part of the splice device itself and not as an insulator and protector of a separate and distinct splice member.

In U.S. Pat. No. 3,824,331 issued July 16, 1974 an insulation sleeve is provided for a splice and the exposed cable ends adjacent thereto. The sleeve is rolled from both ends towards the center over a tube holding the sleeve expanded and the ends are positioned in a retainer. After positioning over the crimped splice the expander tube is removed to allow the sleeve to return to its desired size. The tube is unrolled from both ends and the retainer is broken off.

SUMMARY OF THE INVENTION

The instant invention overcomes the inadequacies and deficiencies of the prior art by providing a high-voltage cable splice protector which is not part of the splice device itself, which can be installed over cables and splice devices having a great range of sizes without special preparation of the cable or splice and which is easy to install without any additional tools and requiring a minimum of skill and experience. The splice protector of the instant invention is made up of two rigid plastic halves arranged to lock with one another by means of a set of bayonet pins upon relative rotation of the halves. An "O" ring seal prevents dirt, moisture and other environmental contaminants from entering the protector. Adjacent the locking ends and extending for a length in excess of standard splices the protector is maintained at uniform internal and external diameters and is reduced in internal and external diameters for a relatively short extent adjacent the cable entrances to the protector. A tapered transition region extends between the two. At least two slots extend inwardly from the ends of the cable entrances towards the tapered regions, dividing the cable entrances into at least two segments which are radially displaceable. Mounted atop the cable entrances are rolled tubes which are unrolled over the cable entrances and cables to provide the desired seals.

To use the splice protector of the invention, the respective halves are positioned over the cable ends before the cable ends are spliced. The cable ends and concentric neutral are spliced in their usual manner and the protector halves are moved together. The halves are rotated so that the bayonet pins on one half engage the corresponding, associated slots on the other locking the protector in place. Next, the segments of the cable entrance portions are radially displaced to release the rolled tubes and the tubes are rolled out to their final positions. It is an object of this invention to provide a high voltage cable splice protector which is easy to use, quick to install and requires no special tools or operator skills or experience.

It is an object of the invention to provide a novel cable splice protector comprised of two mating halves locked together by bayonet lock means and having rolled tubes to seal the cable entrances to the protector.

It is still an object of the invention to provide a splice protector with novel rolled tubes positioned and held in place on the end portions of the novel protector and released by the inward radial deflection of the segments of the end portions.

It is another object of the invention to provide a bayonet locking means for a novel cable splice protector.

It is yet another object of the invention to provide a novel cable splice protector comprising two mating halves locked together by bayonet lock means and having rolled tubes which can be unrolled to seal the entrance of cables into said protector.

Other objects and features of the invention will be pointed out in the following description and claims and illustrated in the accompanying drawings, which disclosure, by way of example, the principles of the invention, and the best mode which has been contemplated for carrying it out.

BRIEF DESCRIPTION OF THE DRAWINGS

In the drawings in which similar elements are given similar reference characters:

FIG. 1 is a side elevation of the plug housing member of a high voltage cable splice protector constructed in accordance with the concepts of the invention.

FIG. 2 is a side elevation of the receptacle housing member of a high voltage cable splice protector and which mates with the member of FIG. 1.

FIG. 3 is a side elevation of the rolled tube for the plug housing member of FIG. 1.

FIG. 4 is a side elevation of the rolled tube for the receptacle housing member of FIG. 2.

FIG. 5 is a side elevation of the protector constructed in accordance with the concepts of the invention installed upon two high voltage cables.

FIG. 6 is a reproduction of FIG. 5, partially in section, showing the inner details of the protector.

DESCRIPTION OF THE PREFERRED EMBODIMENT

Figure 7:
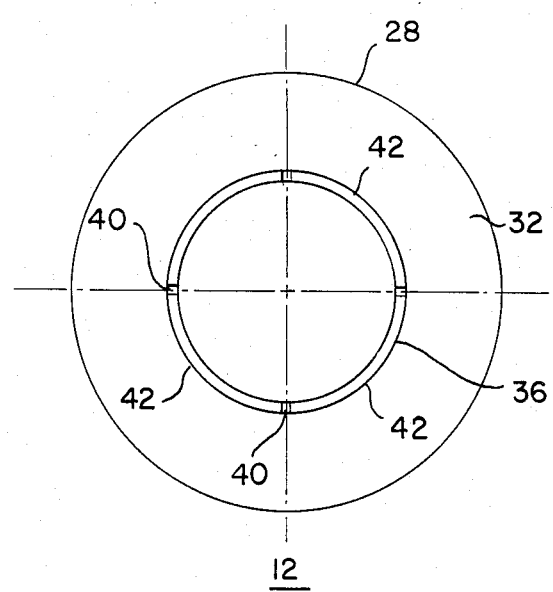
FIG. 7 is an end elevation of the cable entrance portion of the plug housing member prior to displacement of the segments.

Turning now to the figures there is shown a high voltage cable splice protector 10 constructed according to the concepts of the invention. Protector 10 is made up of plug housing member or shell 12 and receptacle housing member or shell 14 which may be locked together by means of bayonet locking pins 16 on plug shell 14 and dog-leg slots 18 on receptacle shell 14. Two or more pins 16 may be employed with a corresponding number of dog-leg slots 18 and the positions of the pins and slots may be interchanged between shells 12 and 14. An "O" ring seal 26 is partially compressed when shells 12 and 14 are joined and serves to keep pins 16 against the front defining walls of the locking leg slots 22 of the slots 18 and protrusions 24 keep pins 16 from entering entrance leg slots 20 of dog-leg slots 18 thereby preventing unwanted separation of the shells 12 and 14. The "O" ring seal 26 is compressed further to clear pins 16 from the walls of locking leg slots 22 and protrusions 24, then either of the shells 12, 14 are turned in the appropriate direction or both shells 12 and 14 are turned in opposite directions until pins 16 enter the entrance leg slots 20 at which time the "O" ring seal 26 expansion assists in separating the shells 12 and 14. Shells 12 and 14 are joined in a manner opposite to that described to separate the shells.

The shells 12 and 14 are fabricated from any rigid or semi-rigid insulating plastic material such as polypropylene. The interior diameter will be large enough to accommodate a wide range of splice connectors as well as the connectors for the separately joined concentric neutrals. The shells 12 and 14 have first cylindrical portions or splice ends 28, 30 respectively, of uniform internal and external diameters and of a length of sufficient to accommodate a wide range of splice connectors. Tapered transition regions 32, 34 respectively, of uniformly decreasing internal and external diameters lead from first cylindrical portions 28, 30 to second cylindrical portions or cable entrance ends 36, 38 of the shells 12 and 14 respectively. Second cylindrical portions 36, 38 are similarly of uniform internal and external diameter sufficient to accommodate a wide range of cable diameters such as would be used with the associated splice connectors.

Second cylindrical portions 36, 38 each have two or more slots 40 extending inwardly from their free edges towards their respective transition regions 32, 34 but stopping short thereof. These slots 40 divide second cylindrical portions or cable entrance ends into two or more segments 42 as is best seen in FIG. 7. In this condition certain hoop forces will be exerted upon the end tubes, to be described below, to hold same in their rolled up condition as shown in FIG. 6.

Figure 8:
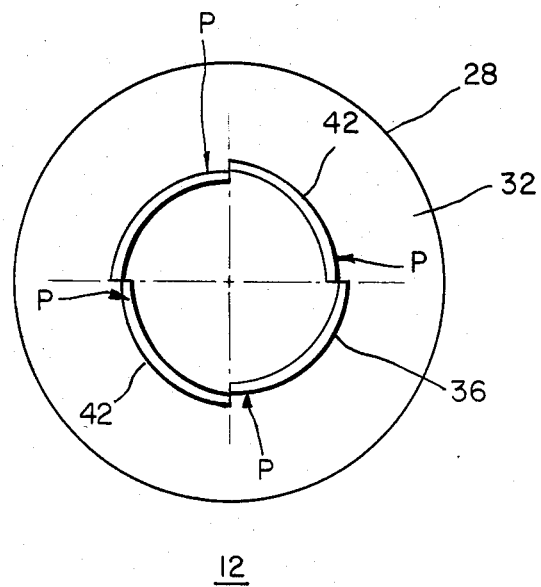
FIG. 8 is an end elevation of the cable entrance portion of the plug housing member after displacement of the segments.

The application of forces adjacent the slots 40 on the segments 42 at the positions shown by the arrows labeled P in FIG. 8 result in the displacement of the segments 42 inwardly reducing the hoop forces exerted upon the rolled end tubes and permitting same to be more easily unrolled. The release of the hoop forces by the inward displacement of segments 42 initiating the unrolling of the rolled end tubes.

Shell 12 has an external, annular ring 44 adjacent the free end of its first cylindrical portion 28 with a shoulder 46 against which "O" ring 26 is retained. Shell 14 has an external annular ring 48 adjacent the free end of its first cylindrical portion 30 with an interior shoulder 50 which also engages "O" ring seal 26. The "O" ring seal 26 is compressed between shoulders 46, 50 when shells 12, 14 are joined to provide a seal against the entrance of dirt, moisture or other environmental contaminants into the splice protector 10. The compressed "O" ring seal 26, as stated above, also assists in keeping shells 12, 14 locked together and in separating them if desired.

The entrances of the high voltage cables 52 into the splice protector 10 are sealed and protected by the use of end tubes 54, 56 mounted, in rolled condition, respectively, on second cylindrical portions 36, 38 of shells 12 and 14, respectively. The tubes 54, 56 are made of an elastomeric material of high insulating value and resilience. The tubes 54, 56 are tightly rolled upon portions 36, 38 and held out of contact with the cables 52 so that the shells 12, 14 can be positioned and moved upon the cables 52 without interference. The tubes 54, 56 are held in their positions by the high hoop forces exerted upon them by the cylindrical portions 36, 38 respectively, keeping them stretched. When the segments 42 are inwardly displaced, as above described, the high hoop forces are reduced and the rolled up tubes 54, 56 start to unroll, an operation completed by the splicer, until the unrolled tubes 54, 56 take the positions shown in FIG. 5 covering the cable 52 ends.

To use protector 10, the high voltage cables 52 are prepared in their usual fashion. A portion of the jacket 58 is removed to expose the semiconductive shield 60 and the shield conductor 62. Although not visible in FIG. 6 a portion of the shield 60 is removed to expose the insulator and a portion of this removed to expose the central conductor. Plug housing member 12 is slipped over one of the cables 52 and moved away from the exposed end. Enclosure housing member 14 is then slipped over the other of the cables 52 to be spliced and similarly moved away from the exposed end. A splice housing 64 of the type shown, described and claimed in U.S. Pat. No. 4,520,229 issued May 28, 1985 and U.S.

Pat. No. Des. 278,230 issued Apr. 2, 1985 and assigned to the assignee of the instant invention is slipped over one of the cable 52 free ends and moved along the cable shield 60. Finally, the exposed central conductors (not shown) are inserted into a crimpable splice connector (not shown) and crimped. The housing 64 is now positioned over the crimped splice connector and the two shield conductors 62 are gathered together, twisted and inserted into a crimpable splice connector 66 which is crimped to such conductors 62.

Shells 12 and 14 are now moved towards one another with the pins 16 entering the slots 20. The shells 12 and 14 are rotated in opposite directions while still forced together to compress "O" ring seal 26 until pins 16 enter slots 22. Upon release the pins 16 engage the walls of the slots 22 and are held there by the protrusions 24 and the attempted expansion of the "O" ring seal 26.

The segments 42 of second cylindrical portions 36, 38 are inwardly displaced and the tubes 54, 56 unrolled to complete the protector 10 installation in the manner shown in FIG. 5.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A cable splice enclosure comprising; rigid, hollow receptacle housing means having a first end and a second end; rigid, hollow plug housing means having a first end and a second end; the outside and inside diameters of said receptacle housing means and said plug housing means adjacent said first ends are of a first predetermined value and define, respectively, receptacle housing means body portion and plug housing means body portion; and the outside and inside diameters of said receptacle housing means and said plug housing means adjacent said second ends are of a second predetermined value less than said first predetermined value and define, respectively, receptacle housing means end portion and plug housing means end portion; the lengths of said receptacle housing means end portion and said plug housing means end portion being short compared to the lengths of said receptacle housing means body portion and said plug housing means body portion; each of said receptacle housing means end portion and said plug housing means end portion have at least two longitudinal slots extending inwardly from said second ends towards said first ends of said respective receptacle housing means and plug housing means for substantially the entire lengths of said receptacle housing means end portion and plug housing means end portion whereby said second predetermined values may be decreased; bayonet locking means joining the first end of said receptacle housing means to said first end of said plug housing means upon relative rotation therebetween; and end sealing means, one adjacent each of said second ends of said receptacle housing means and said plug housing means for sealing the electrical cables entering through said second ends of said receptacle housing means and said plug housing means into said enclosure.

2. A cable splice enclosure as defined in claim 1, wherein each of said end sealing means are rolled lengths of tubing positioned respectively upon said receptacle housing means end portion and said plug housing means end portion.

3. A cable splice enclosure as defined in claim 2, wherein each of said end sealing means is retained in its rolled condition by the hoop forces in said respective receptacle housing means end portion and said plug housing means end portion and are caused to unroll by the reduction of said hoop forces due to the inward deflection of the segments of said receptacle housing means end portion and said plug housing means end portion between said longitudinal slots.

4. A cable splice enclosure as defined in claim 1, wherein said receptacle housing means and said plug housing means each have a tapered transition portion between said portions of first and second predetermined diameter values.

* * * * *